(12) United States Patent
Okuma et al.

(10) Patent No.: US 6,450,691 B1
(45) Date of Patent: Sep. 17, 2002

(54) ROLLING BEARING WITH SEALING PLATE HAVING GREASE ENCLOSED THEREIN

(75) Inventors: Kenji Okuma; Koichi Goto; Takahiko Uchiyama, all of Kanagawa; Shigeharu Saigusa; Katsuyuki Nakai, both of Nara, all of (JP)

(73) Assignees: NSK, Ltd., Tokyo (JP); Toyo Seal Industries Co., Ltd., Nara (JP)

( * ) Notice: Subject to any disclaimer, the term of this patent is extended or adjusted under 35 U.S.C. 154(b) by 0 days.

(21) Appl. No.: 09/645,549

(22) Filed: Aug. 25, 2000

(30) Foreign Application Priority Data

Aug. 25, 1999 (JP) ............................. 11-238183

(51) Int. Cl.[7] ..................... F16C 33/76; F16C 33/66
(52) U.S. Cl. ....................... 384/477; 384/462
(58) Field of Search ................. 384/462, 477, 384/484, 488

(56) References Cited

U.S. PATENT DOCUMENTS 4,758,618 A * 7/1988 Ito et al. ..................... 524/430
5,859,144 A * 1/1999 Saito et al. ............... 525/326.2

FOREIGN PATENT DOCUMENTS

JP 07157620 A * 6/1995
JP 09143327 A * 6/1997

* cited by examiner

Primary Examiner—Thomas R. Hannon
(74) Attorney, Agent, or Firm—Sughrue Mion, PLLC

(57) ABSTRACT

As a grease to be enclosed in the portion in which a rolling bearing is installed, there is used a urea-based grease. An elastic material constituting a sealing plate is made of a vulcanizable fluororubber composition containing a vinylidene fluoride-tetrafluoroethylene-propylene terpolymer or tetrafluoroethylene-propylene bipolymer.

8 Claims, 3 Drawing Sheets

ROLLING BEARING WITH SEALING PLATE HAVING GREASE ENCLOSED THEREIN

BACKGROUND OF THE INVENTION

1. Field of the Invention

The present invention relates to a rolling bearing with a sealing plate having a grease enclosed therein, which is used to form the rotary supporting portion of automobile auxiliary machineries to be installed in engine room such as alternator and compressor. In other words, the present invention is intended to improve the reliability and durability of a rolling bearing with a sealing plate having a grease enclosed therein which is used at high temperatures (e.g., 170° C. or higher).

2. Description of the Related Art

In order to form the rotary supporting portion of various mechanical devices, rolling bearings with a sealing plate 1 and 1a as shown in FIGS. 1 and 2, respectively, are used. The rolling bearings with a sealing plate 1 and 1a each composed of an outer race 3 having an outer raceway 2 formed in the middle portion of the inner surface thereof, an inner race 5 having an inner raceway 4 formed in the middle portion of the outer surface thereof, and a plurality of rolling elements rotatably provided between the outer raceway 2 and the inner raceway 4. Provided extending between the both ends of the inner surface of the outer race 3 and the both ends of the inner race 5 is a sealing plate 7a or 7b. The sealing plate 7a or 7b blocks the both axial opening ends of a space 8 defined by the inner surface of the outer race 3 and the outer surface of the inner race 5 having the rolling elements 6 provided therein. A grease is enclosed in the space 8 between the pair of sealing plates 7a or 7b to lubricate the area at which the outer raceway 2 and the inner raceway 4 come in rolling contact with the rolling surface of the rolling elements 6.

The sealing plates 7a and 7b each comprise a circular core metal 9 formed by a metal plate such as steel plate, and an elastic material 10a or 10b provided covering the core metal 9 and reinforced by the core metal 9. The inner and outer edges of the elastic materials 10a and 10b radially protrude beyond the inner and outer edges of the core metal 9. The sealing plates 7a and 7b engage the elastic materials 10a and 10b, respectively, with a stop groove 11 formed on the both ends of the inner surface of the outer race 3 so that they are supported at the both axial ends of the space 8. The inner edge of the elastic material 10a shown in FIG. 1 comes in sliding contact with a part of the surface of the inner race 5 while the inner edge of the elastic material 10b shown in FIG. 2 is closely opposed to a part of the surface of the inner race 5. In other words, the sealing plate 7a shown in FIG. 1 is a contact type seal while the sealing plate 7b is a non-contact type seal.

As the grease to be enclosed in the space 8, which constitutes the rolling bearing 1 or 1a having a grease enclosed therein, and the elastic material 10a or 10b, which constitutes the sealing plate 7a or 7b, respectively, there have been heretofore used usually the following materials (1) to (5).

[Grease]

(1) Urea-based grease comprising as a thickening agent a urea compound comprising isocyanate and amine and as a base oil comprising PAO and ether singly or in admixture;

(2) Fluorine-based grease having excellent high temperature characteristics;

[Elastic Materials 10a, 10b]

(3) Acrylic rubber obtained by the polymerization of ethyl acryate;

(4) Fluororubber obtained by the copolymerization of vinylidene fluoride with hexafluoropropylene; and (5) Fluororubber obtained by the copolymerization of vinylidene fluoride, tetrafluoroethylene and hexafluoropropylene Heretofore, a grease selected from the group consisting of the foregoing materials (1) and (2) and a sealing plate 7a or 7b comprising the elastic material 10a or 10b, respectively, made of a rubber selected from the foregoing materials (3) to (5) have been properly combined to form a rolling bearing 1 or 1a with a sealing plate having a grease enclosed therein.

The foregoing combination of the grease and elastic material 10a or 10b made of the material which has been heretofore known cannot necessarily assure sufficient reliability and durability at high temperatures.

The combination of the fluorine-based grease (2) and the fluororubber (4) or (5) exhibits a sufficient heat resistance but exhibits an insufficient grease durability under high rate and high load working conditions. Accordingly, this combination is not suitable for the construction of the rotary supporting portion of alternator, compressor, etc.

Further, the combination of the fluorine-based grease (2) and the acrylic rubber (3) not only exhibits an insufficient grease durability under high rate and high load working conditions but also exhibits a deteriorated elasticity of acrylic rubber after prolonged use at high temperatures, causing the sealing plate 7a or 7b to show a deterioration of sealing properties. Accordingly, this combination, too, is not suitable for the construction of the rotary supporting portion of alternator, compressor, etc.

Moreover, the combination of the urea-based grease (1) and the acrylic rubber (3) exhibits a deteriorated elasticity (hardening) of acrylic rubber after prolonged use at high temperatures, causing the sealing plate 7a or 7b to show a deterioration of sealing properties. Accordingly, this combination, too, is not suitable for the construction of the rotary supporting portion of alternator, compressor, etc.

Further, the combination of the urea-based grease (1) and the fluororubber (4) or (5) exhibits a deteriorated elasticity of fluororubber due to the effect of urea compound at high temperatures, causing the sealing plate 7a or 7b to show a deterioration of sealing properties. Accordingly, this combination, too, is not suitable for the construction of the rotary supporting portion of alternator, compressor, etc.

As mentioned above, a urea-based grease, if used as a grease, exhibits an insufficient durability under high rate and high load working conditions in any case. The resulting rolling bearing with a sealing plate having a grease enclosed therein cannot be secured with a sufficient durability. The results of experiment made by the inventors in this respect will be described in connection with FIG. 3. The experiment was made with a deep groove ball bearing having an inner diameter of 17 mm, an outer diameter of 52 mm and a width of 17 mm. In some detail, this ball bearing was operated at a rotary speed of 18,000 r.p.m. at an ambient temperature of 180° C. and a radial load of 150 kgf. Under these conditions, the time required until seizing due to mallubrication occurs was measured. As samples there were prepared two each for rolling bearing having a urea-based grease enclosed therein and rolling bearing having a fluorine-based grease enclosed therein, totaling four. As can be seen in FIG. 3, which shows the results of the foregoing experiment, the rolling bearing having a fluorine-based grease showed seizing in about 10 to 20 hours. On the contrary, any samples comprising a urea-based grease didn't show seizing even after 500 hours. The experiment was terminated after 500 hours.

As can be seen in the results of the foregoing experiment, the grease to be enclosed in a rolling bearing with a sealing plate which constitutes the rotary supporting portion of automobile auxiliaries to be installed in engine room such as alternator and compressor is preferably urea-based. As previously mentioned, on the other hand, the combination of a urea-based grease and the conventional fluororubber (4) or (5) is liable to hardening of fluororubber at high temperatures that makes it difficult to secure sufficient sealing properties as previously mentioned. The results of experiment made by the inventors in this respect are shown in Table 1.

TABLE 1

|  |  | Grease | |
| --- | --- | --- | --- |
|  |  | Urea-based | Fluorine-based |
| Elastic material | Fluororubber | x | o |
|  | Acrylic rubber | o | o |

The experiment the results of which are set forth in Table 1 was carried out by embedding specimens of the foregoing rubbers (4) and (5) and acrylic rubber (3) which had heretofore been as elastic materials 10a and 10b for sealing plates 7a and 7b, respectively, in a urea-based or fluorine-based grease. The ambient temperature during experiment was 190° C. The experiment time (embedding time) was 100 hours. After the lapse of 100 hours, the specimen was then withdrawn from the grease for visual observation. When an abnormality in external appearance such as swelling and damage occurs, it is represented by the symbol x. When no such an abnormality occurs, it is represented by the symbol o. The results are set forth Table 1 above. As can be seen in the experiment the results of which are shown in FIG. 3 and the experiment the results of which are set forth in Table 1 above, the grease to be enclosed in the rolling bearing with a sealing plate constituting the rotary supporting portion of automobile auxiliaries to be installed in engine room such as alternator and compressor is preferably urea-based and the elastic materials 10a and 10b for sealing plate 7a and 7b, respectively, having a good affinity for urea-based grease is an acrylic rubber.

However, if as the elastic materials 10a and 10b for sealing plates 7a and 7b, respectively, there is used an acrylic rubber, the acrylic rubber showed a drop of elasticity after prolonged use at high temperatures, making it difficult for the sealing plate 7a or 7b to provide sufficient sealing properties over an extended period of time as previously mentioned. Accordingly, the acrylic rubber, too, cannot be preferably used as the elastic material 10a or 10b for rolling bearing with a sealing plate.

SUMMARY OF THE INVENTION

It is an object of the present invention to provide a rolling bearing capable of securing sufficient reliability and durability even under high temperature, high speed and high load working conditions.

DETAILED DESCRIPTION OF THE INVENTION

The present invention will be described as follows in detail.

According to the present invention, a rolling bearing with a sealing plate having a grease enclosed therein includes an outer race having an outer raceway formed on the inner surface thereof; an inner race having an inner raceway formed on the outer surface thereof; a plurality of rolling elements rotatably provided between the outer raceway and the inner raceway; a pair of sealing plates each having an elastic material, which is provided for covering between the both ends of the inner surface of the outer race and the both ends of the outer surface of the inner race, for blocking the both axial opening ends of the space defined by the inner surface of the outer race and the outer surface of the inner race having the rolling elements provided therein; and a grease enclosed in the space between the sealing plates. In this rolling bearing, the grease is a urea-based grease and the elastic material is a vulcanizable fluororubber composition composed of at least one of a vinylidene fluoride-tetrafluoroethylene-propylene terpolymer and a tetrafluoroethylene-propylene bipolymer.

As the foregoing vinylidene fluoride-tetrafluoroethylene-propylene terpolymer, there is preferably used one having a vinylidene fluoride copolymerization ratio of from about 1 to 70 mol % (preferably from 2 to 65 mol %), a tetrafluoroethylene copolymerization ratio of from about 1 to 70 mol % (preferably from 20 to 60 mol %) and a propylene copolymerization ratio of from about 1 to 70 mol % (preferably from 10 to 45 mol %). As such a vinylidene fluoride-tetrafluoroethylene-propylene terpolymer there may be used a commercially available product such as "BRE LJ-298005" (produced by SUMITOMO 3M LIMITED).

As the foregoing tetrafluoroethylene-propylene bipolymer there is preferably used one having a tetrafluoroethylene copolymerization ratio of from about 20 to 80 mol % (preferably from 40 to 60 mol %) and a propylene copolymerization ratio of from about 20 to 80 mol % (preferably from 40 to 60 mol %). As such a tetrafluoroethylene-propylene bipolymer there may be used a commercially available product such as "AFLAS 150" (produced by Asahi Glass Co., Ltd.).

Figure 1:
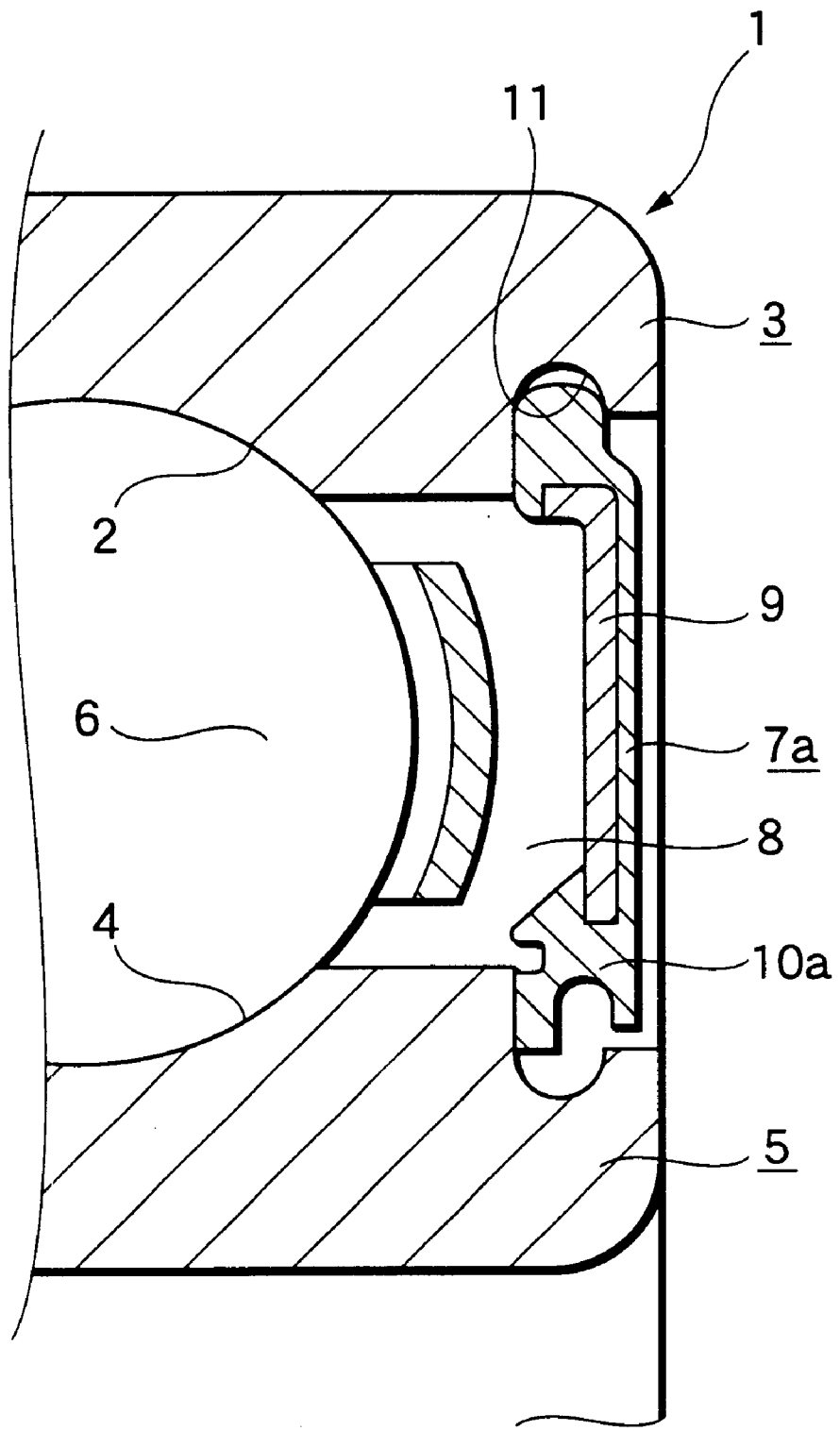
FIG. 1 is a partly enlarged sectional view illustrating a first embodiment of the rolling bearing with a sealing plate to which the present invention applies.
Figure 2:
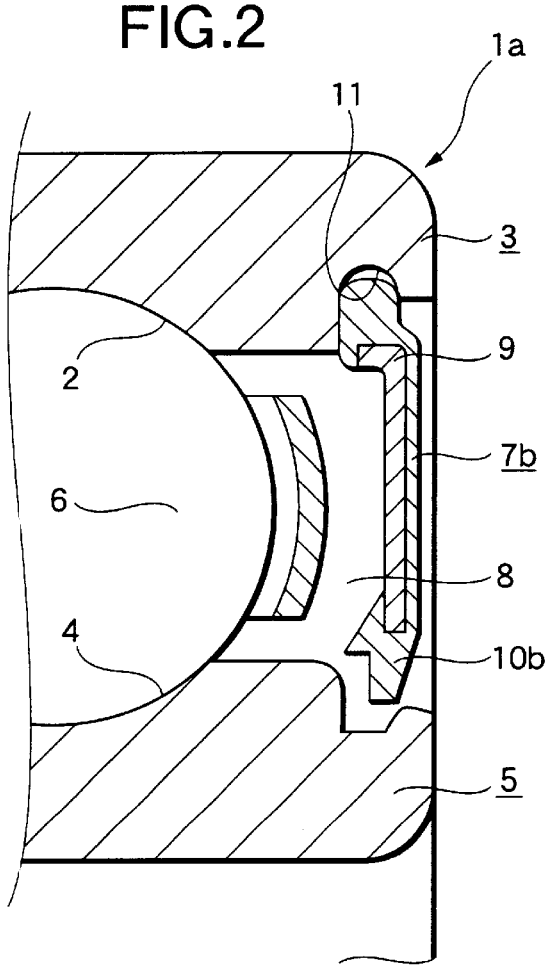
FIG. 2 is a partly enlarged sectional view illustrating a second embodiment of the rolling bearing with a sealing plate to which the present invention applies.
Figure 3:
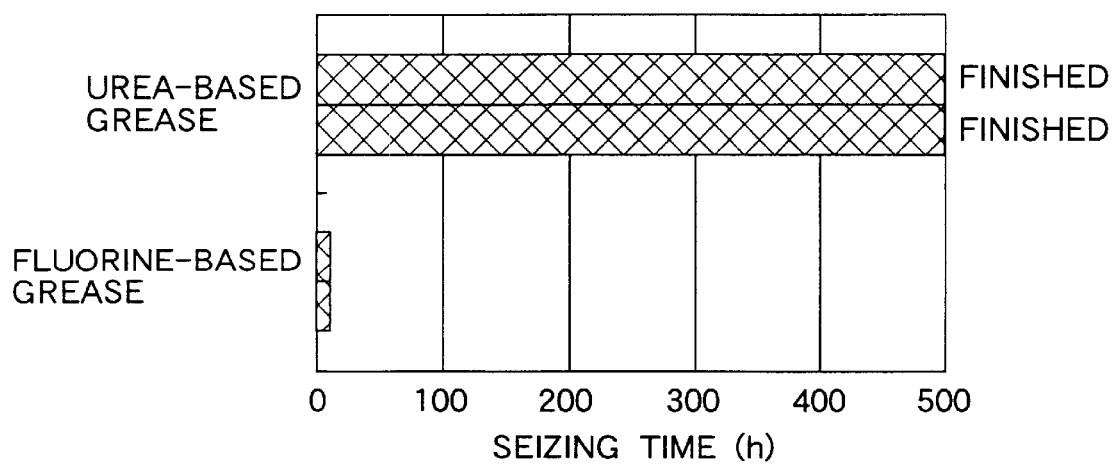
FIG. 3 is a graph illustrating the results of an experiment made to know the effect of the kind of grease on the durability of the rolling bearing.

Any fluororubber of the foregoing terpolymer, bipolymer or proper composite thereof are blended with various compounding agents required from the standpoint of vulcanizability, physical properties and workability. The mixture is then kneaded by any known method using an open roll mill, kneader or the like to adjust the composition thereof. The composition thus adjusted is then subjected to vulcanization by any known vulcanization process such as heat press to obtain an elastic material 10a or 10b as shown in FIG. 1 or 2. During the vulcanization, the core metal 9 for forming the sealing plate 7a or 7b with the elastic material 10a or 10b, respectively, is previously set in the molding cavity.

The rolling bearing with a sealing plate having a grease enclosed therein according to the invention includes a urea compound enclosed therein as a grease and thus can be secured with a sufficient grease durability even under high temperature, high rate and high load working conditions. Further, the fluororubber which is a vinylidene fluoride-tetrafluoroethylene-propylene terpolymer, tetrafluoroethylene-propylene bipolymer or complex thereof, has a sufficient heat resistance and doesn't become hard too much even when brought into contact with the urea compound at high temperatures. Thus, the sealing plate can assure sufficient sealing properties even after prolonged use at high temperatures.

EXAMPLES

In order to confirm the effect of the present invention, the results of the experiment made by the inventors will be described hereinafter. For the experiment, four samples set forth in Table 2 below (two comparative examples outside the technical scope of the present invention and two examples falling within the technical scope of the present invention) were prepared. These samples were each measured for change of physical properties with urea-based grease.

TABLE 2

| | Comparative Example 1 | Comparative Example 2 | Example 1 | Example 2 |
|---|---|---|---|---|
| Material | | | | |
| Nipol AR-71 *1 | 100 | | | |
| FC-2176 *2 | | 100 | | |
| BRE LJ-298005 *3 | | | 100 | |
| AFLAS 150 *4 | | | | 100 |
| ASAHI 60H *5 | 60 | | | |
| celite #219 *6 | | 25 | 25 | 25 |
| Sodium stearate | 3 | | | |
| Potassium stearate | 0.5 | | | |
| Sulfur | 0.3 | | | |
| Kyowamag 150 *7 | | 3 | 3 | |
| Calbit *8 | | 6 | 6 | 3 |
| TAIC *9 | | | | 5 |
| Barhexa 25B-40 *10 | | | | 1 |
| Vulcanizing conditions | | | | |
| Primary vulcanization | 170° C. × 20 min. | 170° C. × 10 min. | 170° C. × 10 min. | 170° C. × 10 min. |
| Secondary vulcanization | 150° C. × 8 hrs. | 210° C. × 17 hrs. | 210° C. × 17 hrs. | 210° C. × 17 hrs. |
| Dry physical properites | | | | |
| Hardness (shore A) | 69 | 75 | 78 | 70 |
| Tensile strength (kgf/cm²) | 150 | 125 | 117 | 205 |
| Elongation (%) | 155 | 280 | 250 | 260 |
| Urea grease resistance A | | | | |
| *11 | | | | |
| Hardness change (point) | +5 | +25 | −2 | −1 |
| % Change of tensile strength | −10 | −42 | −16 | −5 |
| % Elongation change | −40 | −100 | −12 | −6 |
| % Volume change | +11.3 | +47.6 | +8.0 | +4.2 |
| Urea grease resistance B | | | | |
| *12 | | | | |
| Hardness change (point) | +5 | +25 | +2 | +1 |
| % Change of tensile strength | +8 | −100 | −10 | −8 |
| % Elongation change | −42 | −100 | −22 | −10 |
| % Volume change | +6.1 | +8.4 | +7.2 | +3.9 |

In the leftmost column in Table 2, *1 indicates the trade name of an acrylic rubber produced by Nippon Zeon Co., Ltd., *2 indicates the trade name of a fluororubber as vinylidene fluoride-hexafluoropropylene bipolymer produced by SUMITOMO 3M LIMITED, *3 indicates the trade name of a fluororubber as vinylidene fluoride-tetrafluoroethylene-propylene terpolymer produced by SUMITOMO 3M LIMITED, *4 indicates the trade name of a fluororubber as tetrafluoroethylene-propylene bipolymer produced by Asahi Glass Co., Ltd., *5 indicates the trade name of an MAF carbon produced by Asahi Carbon Co., Ltd., *6 indicates the trade name of diatomaceous earth produced by Manville Inc., *7 indicates the trade name of magnesium oxide produced by Kyowa Chemical Industry Co., Ltd., *8 indicates the trade name of calcium hydroxide produced by Ohmi Chemical Industry Co., Ltd., *9 indicates the trade name of triallyl isocyanate produced by Nippon Kasei Co., Ltd., *10 indicates the trade name of an organic peroxide produced by NOF Corp., *11 indicates a urea-based grease contains an ether as a base oil and a urea compound as a thickening agent, and *12 indicates a urea-based grease contains a mixture of ether and PAO as a base oil and a urea compound as a thickening agent.

The material obtained by kneading the composition set forth in Table 2 through an open roll mill was then subjected to vulcanization under the conditions described in Table 2 to obtain a vulcanized product. Among these vulcanized products, those of Comparative Example 2 and Examples 1 and 2 containing a fluororubber were each dipped in a urea-based grease which had been heated to a temperature of 180° C. for 70 hours, withdrawn from the grease, and then measured for dry mechanical properties and volume change. For the measurement of dry physical properties, methods according to JIS K 6251 and JIS K 6253 were employed. For the measurement of volume change, a method according to JIS K 6258 was employed. The results of experiments thus made are set forth in Table 2.

As can be seen in Table 2, when the elastic material forming the sealing plate is formed by a fluororubber which is a tetrafluoroethylene-propylene bipolymer or vinylidene fluoride-tetrafluoroethylene-propylene terpolymer, the change of physical properties and volume can be minimized even when the elastic material is brought into contact with the urea-based grease at high temperatures. This demonstrates that such an elastic material can exhibit good sealing properties over an extended period of time even when a urea-based grease is used.

The inventors made a second experiment to know how the hardness of the elastic material constituting the sealing plate changes with the affinity of the elastic material for the grease and the ambient temperature. The second experiment was carried out by allowing a deep groove ball bearing with a contact type sealing plate of Call No. 6202 having an inner diameter of 15 mm, an outer diameter of 35 mm and a width of 11 mm to stand in a high temperature atmosphere. The ambient temperature was 180° C. The period of time during which the ball bearing is allowed to stand was 500 hours. At the lapse of 70 hours, 168 hours and 500 hours, the hardness of the elastic material constituting the sealing plate incorporated in the sample was then measured by the method for measuring international rubber hardness defined in JIS K 6253 (IRHD).

Figure 4:
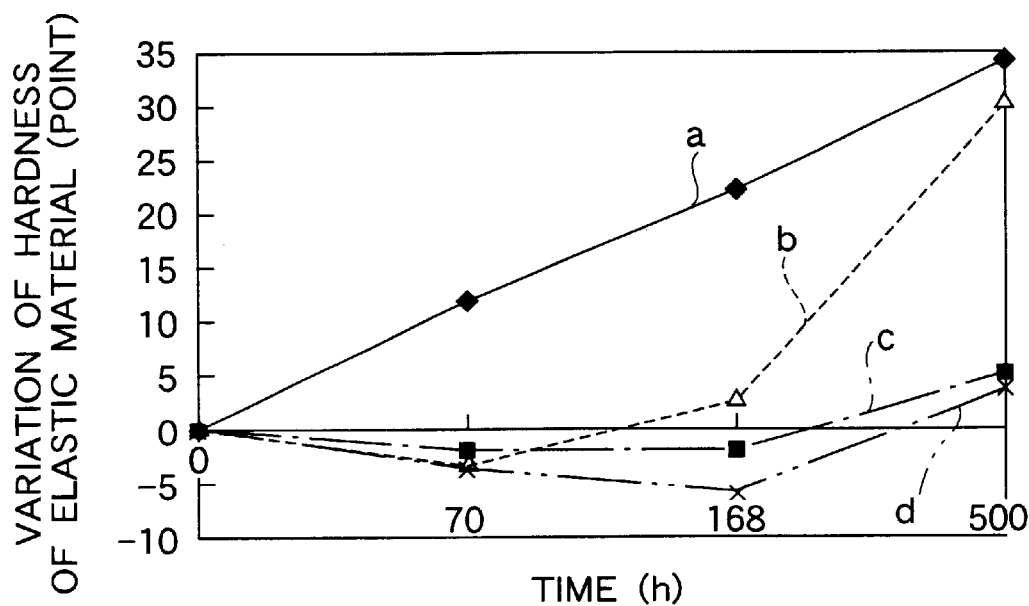
FIG. 4 is a graph illustrating the results of an experiment made to know the effect of the material of the elastic material constituting the sealing plate and the material of the grease on the change of the hardness of the elastic material.

The results of the second experiment were shown in FIG. 4. Among the four curves shown in FIG. 4, the solid line a indicates the results of experiment on the combination of a conventional sealing plate provided with an fluororubber rubber elastic material and a urea-based grease, the broken line b indicates the results of experiment on the combination of a sealing plate provided with an acrylic rubber elastic material and a urea-based grease, the dot-and-chain line c indicates the results of experiment on the combination of a sealing plate provided with a fluororubber elastic material and a urea-based grease according to the invention, and the two dots-chain line d indicates the results of experiment on the combination of a conventional sealing plate provided with a fluororubber elastic material and a fluorine-based grease. As can be seen in the results of experiment shown in FIG. 4, the present invention makes it possible to minimize the change in the hardness of the elastic material as in the case where a fluorine-based grease is used as a grease. The combination with a fluorine-based grease cannot provide a sufficient durability under high speed and high load operating conditions as previously mentioned. The enhancement of the hardness of the acrylic rubber elastic material as shown in FIG. 4 is attributed to the heat resistance problem with the acrylic rubber itself rather than the problem of affinity for urea-based grease.

Figure 5:
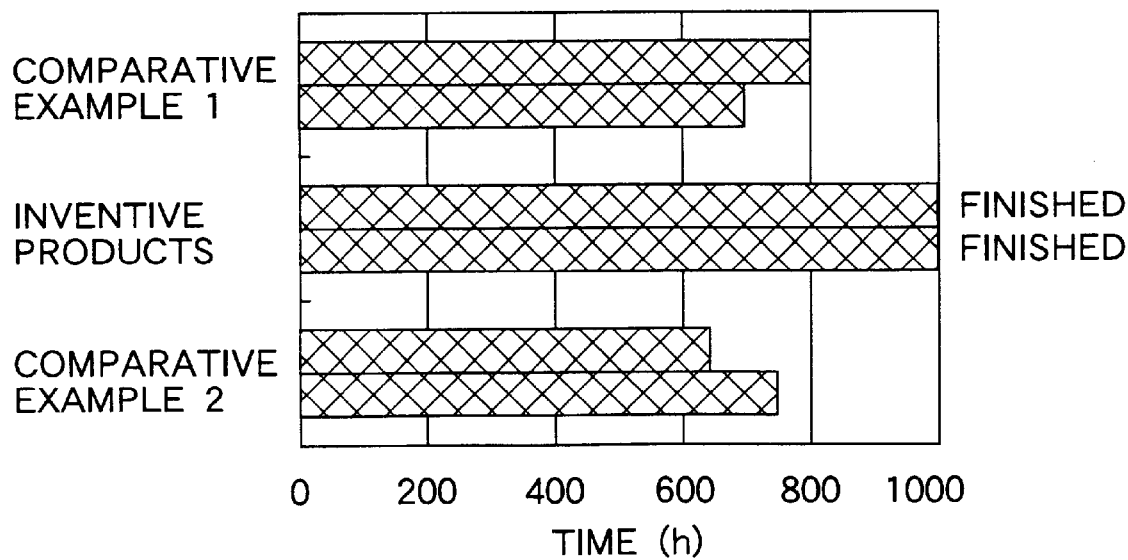
FIG. 5 is a graph illustrating the results of an experiment made to know the effect of the material of the elastic material constituting the sealing plate and the material of the grease on the durability of the rolling bearing.

The inventors further made an experiment on the durability of grease during high speed operation. The results of this experiment will be described in connection with FIG. 5. The experiment was made on a deep groove ball bearing having an inner diameter of 17 mm, an outer race of 52 mm and a width of 17 mm. The inner race of the ball bearing was rotated at 18,000 r.p.m. in a 180° C. atmosphere. The time required until seizing due to mallubrication occurs was measured. As samples there were prepared two each for the combination of a sealing plate containing an acrylic rubber elastic material and a urea-based grease (Comparative Example 1), the combination of a sealing plate composed of a fluororubber elastic material and a urea-based grease according to the invention (product according to the invention) and the combination of a sealing plate containing a conventional fluororubber elastic material and a urea-based grease (Comparative Example 2) as set forth in Table 2, totaling six. As can be seen in FIG. 5 showing the results of the foregoing experiment, when the sealing plate containing an acrylic rubber elastic material or conventional fluororubber elastic material was used, malsealing occurred in 650 hours to 800 hours at which the evaluation test was suspended. On the contrary, when the sealing plate containing a fluororubber elastic material according to the invention was used, any samples didn't show troubles even after the lapsed of 1,000 hours. The experiment was terminated after the lapse of 1,000 hours.

The rolling bearing with a sealing plate having a grease enclosed therein according to the invention has the foregoing constitution and action and thus can contribute to the improvement of reliability and durability of the rotary supporting portion of various apparatus to be used in a high temperature atmosphere under a high load and high speed conditions such as automobile auxiliaries.

What is claimed is:

1. A rolling bearing with a sealing plate having a grease enclosed therein comprising:

an outer race having an outer raceway formed on the inner surface thereof;

an inner race having an inner raceway formed on the outer surface thereof;

a plurality of rolling elements rotatably provided between said outer raceway and said inner raceway;

a pair of sealing plates each having an elastic material, which is provided for covering between the both ends of the inner surface of said outer race and the both ends of the outer surface of said inner race, for blocking the both axial opening ends of the space defined by the inner surface of said outer race and the outer surface of said inner race having said rolling elements provided therein; and a grease enclosed in said space between said sealing plates;

wherein said grease is a urea-based grease and said elastic material is a vulcanizable fluororubber composition comprising at least one of a vinylidene fluoride-tetrafluoroethylene-propylene terpolymer and a tetrafluoroethylene-propylene bipolymer.

2. The rolling bearing according to claim 1, wherein the foregoing vinylidene fluoride-tetrafluoroethylene-propylene terpolymer has a vinylidene fluoride copolymerization ratio of from 1 to 70 mol %, a tetrafluoroethylene copolymerization ratio of from 1 to 70 mol % and a propylene copolymerization ratio of from 1 to 70 mol %.

3. The rolling bearing according to claim 2, wherein the foregoing vinylidene fluoride-tetrafluoroethylene-propylene terpolymer has a vinylidene fluoride copolymerization ratio of from from 2 to 65 mol %, a tetrafluoroethylene copolymerization ratio of from 20 to 60 mol % and a propylene copolymerization ratio of from 10 to 45 mol %.

4. The rolling bearing according to claim 1, wherein the tetrafluoroethylene-propylene bipolymer has a tetrafluoroethylene copolymerization ratio of from 20 to 80 mol % and a propylene copolymerization ratio of from 20 to 80 mol %.

5. The rolling bearing according to claim 1, wherein the tetrafluoroethylene-propylene bipolymer has a tetrafluoroethylene copolymerization ratio of from 40 to 60 mol % and a propylene copolymerization ratio of from 40 to 60 mol %.

6. The rolling bearing according to claim 1, wherein one of said inner and outer races is rotatable relative to the other.

7. The rolling bearing according to claim 1, wherein said rolling bearing is connected to a rotary supporting portion of automobile auxiliaries.

8. The rolling bearing according to claim 7, wherein the rotary supporting portion includes an alternator or a compressor.

\* \* \* \* \*